United States Patent
Borgmann et al.

(10) Patent No.: US 6,613,813 B1
(45) Date of Patent: Sep. 2, 2003

(54) LOW-MIGRATION, LOW-ODOR AND LOW-SWELLING SHEET OFFSET PRINTING INK

(76) Inventors: Ursula Borgmann, Rosenheimerstrasse 25 85567, Grafing (DE); Thomas Fuss, Parkstrasse 8 85646, Anzing (DE); Klaus Hanke, Weissdornweg 27 85551, Kirchheim (DE)

( * ) Notice: Subject to any disclaimer, the term of this patent is extended or adjusted under 35 U.S.C. 154(b) by 0 days.

(21) Appl. No.: 09/125,738

(22) PCT Filed: Dec. 16, 1997

(86) PCT No.: PCT/DE97/02956

§ 371 (c)(1),
(2), (4) Date: Jan. 4, 2000

(87) PCT Pub. No.: WO98/28373

PCT Pub. Date: Jul. 2, 1998

(51) Int. Cl.$^7$ .............. C08K 5/10; C08L 23/00; C08L 61/06; C08L 93/04; C09D 11/10

(52) U.S. Cl. .............. 523/160; 524/270; 524/271; 524/318; 525/149

(58) Field of Search ............... 523/160, 161; 106/31.27, 31.4, 31.41, 31.6, 31.72, 31.73; 525/149; 524/270, 271, 318, 390, 391, 379, 474, 490

(56) References Cited

U.S. PATENT DOCUMENTS

| | | | | |
|---|---|---|---|---|
| 4,028,291 A | * | 6/1977 | Tsuchiya et al. ............ 524/852 |
| 4,169,821 A | * | 10/1979 | Werner et al. ............ 525/54.44 |
| 4,196,033 A | * | 4/1980 | Arai et al. ................... 156/196 |
| 4,253,397 A | * | 3/1981 | Emmons et al. ......... 101/450.1 |
| 4,262,936 A | * | 4/1981 | Miyamoto ................... 503/206 |
| 4,357,164 A | * | 11/1982 | Tsuji et al. .................. 524/145 |
| 5,075,699 A | * | 12/1991 | Koike et al. ................. 347/100 |
| 5,286,287 A | * | 2/1994 | Hirasawa et al. .......... 106/31.8 |
| 5,431,721 A | * | 7/1995 | Pennaz et al. .............. 524/251 |
| 5,886,066 A | * | 3/1999 | Forschirm ................... 523/200 |
| 5,891,943 A | * | 4/1999 | Katsumata et al. ......... 524/310 |
| 5,965,633 A | * | 10/1999 | Revol ......................... 523/160 |

FOREIGN PATENT DOCUMENTS

JP  04359072  * 12/1992

OTHER PUBLICATIONS

Alger, Mark; Polymer Science Dictionary 2nd Ed., Chapman and Hall, London (p. 93), 1989.*

* cited by examiner

*Primary Examiner*—Callie Shusho

(57) ABSTRACT

An offset printing ink is provided which comprises a colophony-modified phenolic resin and at least one component selected from the group consisting of (A) a maleic resin, (B) a modified hydrocarbon resin, (C) a colophony resin ester and mixtures thereof. The ink further comprises a water-insoluble fatty acid ester of a multivalent alcohol which has a high steric spatial requirement, and/or ethinol.

11 Claims, No Drawings

LOW-MIGRATION, LOW-ODOR AND LOW-SWELLING SHEET OFFSET PRINTING INK

The invention relates to a low migration, odor and swelling sheet-fed offset printing ink which is suitable for the production of food wrapping.

On the one hand, sheet-fed offset printing inks are known in the prior art which can be described as low as to odor and flavor. These inks contain low odor components such as hard resins, hydrogenated mineral oil cuts, synthetic aromatic oils, alkyd resins, in particular such with a low iodine number of $\leq 30$ g J2/100 g, and dialkyl ether such as di-n-dodecyl ether, di-n-undecyl ether, allyl-n-octyl ether, n-hexyl-n-undecyl ether as a vehicle.

However, mass transfers of these inks to the filling material can occur, the mass transfers being assessable according to the law of diffusion. However, the German food law prohibits any mass transfer, except for components which are safe with regard to health, odor and flavor and which are technically unavoidable. Migration of the liquid components in inks of the prior art can occur, however, which can further cause the unwanted aspect of the so-called swelling. As a result of migration, in particular thin packing films, i.e. films under 30 $\mu$m, can be affected by warping of the film in form of wrinkling and waves. These warps are irreversible and optically and technically non-acceptable.

Furthermore, so-called anti-swelling inks are known in the prior art which have a vehicle composition free of mineral oil. The serious disadvantage of these inks is, however, that the low-viscous vehicle components can have considerable migration potentials. Therefore, it is possible that mass transfers occur in primary packing which can disadvantageously change the odor and flavor of the filling material, in particular of the food. Such transfers are treated, for example, according to Swiss law as impurities ("Decree on Food Additives and Ingredients"—Fremd- und Inhaltsstoffe-verordnung, FIV—of Jun. 26, 1996). According to the German food law, too, it is applicable to the wrapping of food and semiluxuries that changes in odor and flavor of the filling material by the wrapping are to be avoided (§31 LMBG, section 1).

Therefore, it was an object of the invention to provide sheet-fed offset printing inks which are low in migration and odor as well as low in swelling, and which, therefore, do not cause any unwanted changes in odor and flavor of the wrapping and which obey the migration values stipulated by law, respectively.

Changes in odor and flavor of the wrapped goods caused by printing inks are tested according to DIN 10955, testing of packaging and wrapping material for food. In this connection, the values must be smaller than 2 in order to meet the requirements mentioned.

The object of the invention is solved by an offset printing ink which comprises a colophony-modified phenolic resin (A) and/or a maleic resin (B) and/or a modified hydrocarbon resin (C) and/or a colophony resin ester (D),which is characterized in that it comprises one or more water-insoluble fatty acid ester(s) of multivalent alcohols with a high steric spatial requirement and/or of ethinols as a solvent for the resin(s).

Spatial requirement is to be understood as the three-dimensional steric measurement of molecules. In this connection, the steric measurements of the esters being employed as a solvent can amount to $l_{max}$ of from 2.0 to 7.0 nm in diameter and to a $V_{mean}$ of from 1.0 to 21.0 nm$^3$ in volume, the indicated values referring to the maximum length of the molecules.

Furthermore, in a preferred embodiment, the offset printing ink according to the invention comprises multifunctional allyl esters of multivalent organic acids. These allyl esters are capable of oxidative drying and during the drying process they do not produce any fragments which cause sensory impairments of the wrapped food. In the oxidative drying process, a cross-linking takes place and this results in a stable printing ink film. This process of oxidative cross-linking of the printed ink is caused by the salts of organic acids of cobalt and/or manganese in concentrations of 0.05–0.2% which are contained therein.

Preference is given to allyl esters of multivalent organic acids with an acid number of 2–20 mg KOH/g (DIN 55 936), a iodine number of 50–120 g J$_2$/100 g (DIN 55 936) and a viscosity of 0.5–300 mPa·s measured at 20° C. and 50 l/s as well as with a molecular weight $M_w$ of 300–10000.

Furthermore, an offset printing ink is preferred which comprises a polyallyl ether, additionally. Its function basically corresponds to the one of the multifunctional allyl esters.

With the addition of multifunctional allyl esters and polyallyl ethers, respectively, it is possible to achieve the mechanical resistance which is required in the technical application for the wrapping of food and semiluxuries and which has so far been achieved in a majority of cases only by coating, so that this can be dropped.

Furthermore, an offset printing ink according to the invention is preferred which is free of mineral oil.

These inks are free of substances with a high migration potential. The resins and special fatty acid esters with their high steric spatial requirements contained in the vehicles of the inks and/or the fatty acid esters of ethinols are coordinated so that, also in the case of primary packing, the mass transfer to the food is so much reduced that it distinctly remains under the limit values stipulated by law. Moreover, in the case of direct contact between the printed ink and, for example, a polypropylene packing film there is almost no change in the dimension due to the prevention of a mass transfer according to the invention. This was hitherto caused by a migration to the polymer matrix which is called swelling of films.

Therefore, with the inks according to the invention it is the first time that the advantageous properties low in odor, migration and swelling have been achieved simultaneously in sheet-fed offset printing inks. Therefore, these inks are particularly suited for the production of food wrappings under employment of, for example, cardboard and paper.

Moreover, a very substantial advantage of the offset printing ink according to the invention is the fact that it is based on renewable raw materials.

Furthermore, an offset printing ink according to the invention is particularly preferred in which the fatty acids of the fatty acid esters comprise a carbon chain of 6–26, in particular of 8–26, carbon atoms. The fatty acids can be saturated or unsaturated fatty acids. The following fatty acids are given as examples: octadecene acid, linolic acid, linolenic acid, elaeostearic acid, tetradecanoic acid, hexadecanoic acid, octadecanoic acid, arachic acid, dodecanoic acid, hexanoic acid, octanoic acid, decanoic acid, and docosenoic acid. These fatty acids can be purified by means of distillation before esterifying them.

An offset printing ink according to the invention is preferred in which the multivalent alcohols are selected from trimethylolpropane, pentaerythritol, dipentaerythritol, sorbitol and 2-butyl-2-ethyl-1,3-propanediol. Furthermore, an offset printing ink according to the invention is preferred in which the fatty acid esters of multivalent alcohols have an acid number between 5 and 20 mg KOH/g (DIN 53402), a iodine number between 0 and 150 g $J_2$/100 g (DIN 55936) and a viscosity between 20 and 500 mPa·s (DIN 53229). The multivalent alcohols are polyesterified or completely esterified.

Examples for water-insoluble fatty acid esters which are employed according to the invention are: pentaerythritol tetracaprate, dipentaerythritol hexacaprate, pentaerythritol tetradocoseate, and dipentaerythritol hexadocoseate.

The employment of natural vegetable oils, i.e. of the corresponding triglycerides, cannot solve the problem posed. With the employment of the specified offset printing ink according to the invention it was unexpectedly possible to solve the problem for the first time.

Furthermore, an offset printing ink according to the invention is preferred which is characterized in that that the resins have a molecular weight $M_w$ of 5000–120000, an acid number of 10–40, a hydroxyl number of 20–70 and a melting range of 120–190° C. In this case, the measuring of the melting range is carried out according to the capillary method.

The resins are to behave sensorially neutral and to dissolve in the mentioned fatty acid esters or their mixtures without the employment of co-solvents. Moreover, the resins are to be compatible with the mentioned fatty acid esters or their mixtures. The compatibility of a resin solution and a vehicle, respectively, is defined by the hexane number (HEZ). The compatibility is to be in a HEZ-range between 0 and +20.

Resins with a viscosity of 10–90 Pa·s at 40% in mineral oil (Company Haltermann PKW-F 6/9) and with a viscosity of 20–100 Pa·s at 40% in mineral oil (Company Haltermann PKW-f 6/9 ar), respectively—each measured at 50 l/s and at a temperature of 20° C.—have proved to be particularly suited and thus preferred.

Furthermore, resins with a turbidity point of 55–150° C. at 10% in mineral oil (Company Haltermann PKW-F 6/9 af new) and with a turbidity point of 50–150° C. at 10% in mineral oil (Company Haltermann PKW-F 6/9), respectively, have proved to be particularly suited.

An offset printing ink in which the resins (A):(B) have a quantitative ratio of 33–76:24–67 as well as an offset printing ink in which the resins (A):(B):(C) have a quantitative ratio of 22–51:23–46:16–33 have proved to be advantageous.

Particularly advantageous and thus preferred is an offset printing ink according to the invention in which the resins (A) and (B) as well as the fatty acid ester of multivalent alcohols (E) have a quantitative ratio of 17–36:13–32:45–70 as well as an offset printing ink according to the invention in which the resins (A), (B), (C) and (D) as well as the fatty acid ester (E) have a quantitative ratio of (A):(B):(C):(D):(E) of 0–45:0–32:0–24:0–19:38–70.

The production of the offset printing inks is carried out in a fashion which is known per se.

The ratio of viscosity to tackiness of the offset printing inks should be in the range of 50–120 Pa·s (50 l/s, 20° C.) to 8–14 (26° C.; rate of measurement 200 rpm; 1.3 m³ ink), the tackiness being measured by means of the Pr ůfbau-Inkomat (name of the measuring apparatus) of the company Dürner.

The rheological data of the offset printing inks are adjusted to the requirements of technical application and to the substrates for printing in a way which is known per se.

EXAMPLES

The offset printing inks given in the following examples were produced as follows:

(a) Production of the Vehicle

The solid components of the vehicle were dissolved under stirring and exposure to inert gas in the solvent component or solvent components, having a concentration of 50% at 180–200° C.

(b) Production of the Offset Printing Ink

The solid components were predispersed in 30%-concentration at the dissolver. After addition of the residual vehicle amount the mixture was finely dispersed over a three-roll mill. The viscosity/tackiness ratio of the ink is regulated over the concentration of fatty acid ester.

Example 1

An offset printing ink was produced according to the following formulation:

| Lutetia Rubin BLDN 375 ® | Francolor Pigments | Pigment Red 57:1 | 18% |
|---|---|---|---|
| Ceridust 3620 ® | Hoechst AG | Polyethylene wax | 1% |
| Rice starch powder type B | Almil Leonhardt GmbH | | 0.5% |
| Alsynol RL 62 ® | Arizona Chemical | KP resin | 11.6% |
| Alsynol RC 17 ® | Resisa | Maleic resin | 8.1% |
| Pentalyn 621 ® | Hercules | Colophony ester | 4.2% |
| EW-Print 1041 ® | Henkel KG | Pentaerythritol tetraoleate | 56.6% |
| | | | 100% |

The term KP resin is understood as colophony modified phenolic resin.

Comparison Example

An offset printing ink was produced according to the following formulation:

| Sico Echtgelb D 1361 DD ® | BASF AG | Pigment Yellow 13 | 12% |
|---|---|---|---|
| Sovermol KA 3174 ® | Henkel KG | Coconut alkyd resin | 8% |
| Magnesia 10 | Magnesia GmbH | Magnesium carbonate | 3% |
| Ceridust 3620 ® | Hoechst AG | Polyethylene wax | 1% |
| Rice starch powder type B | Almil Leonhardt GmbH | | 0.5% |
| Alsynol RL 58 ® | Arizona Chemical | KP resin | 11% |
| Tergraf UZ-76 ® | Resisa | KP resin | 16.5% |
| Mediaplast VP 2160 ® | Kettlitz Chemie GmbH | Synthetic aromatic oil | 48% |
| | | | 100% |

The processing of offset printing inks according to example 1 and to the comparison example was carried out on a sheet-fed offset printing machine of the type MAN-Roland R 700 at a printing output of 8000–12000 copies/h under employment of a damping solution having 5% isopropanol. Printing was carried out at 1.5–2 g/m² on cellulose cardboard which was suited for the production of primary packing for food.

Immediately after the printing process, the samples were tightly packed in aluminum foil and handed over to the Fraunhofer Institut Lebensmitteltechnologie und Verpackung (Fraunhofer institute for food technology and wrapping), Munich, for the analysis of the migration according to the Tenax method which had been developed there. The mass transfer at direct contact between the printed cardboard side and Tenaxe® as a food simulator is determined by means of this method (24 hours at 60° C.). Tenax® is an adsorbent which is distributed by the company Akzo. Tenax® is a polyphenylene oxide on the basis of 2,6-diphenylphenol.

In the report prepared by the Fraunhofer Institut it was confirmed that the quantity of the total amount of the migrated substances of the sample of the offset printing ink according to the invention according to example 1 is, in contrast to the offset printing ink according to the comparison example, not above the amount of the unprinted cardboard. Therefore, prints produced with the offset printing ink according to the invention do not have elevated migration values in comparison to the unprinted cardboard.

Furthermore, in-house tests had the following results:
(a) Cardboard cuttings which had been printed on with the offset printing ink according to the invention did virtually cause no swelling in contact with a 16 μm thick polypropylene film.
(b) The sensory tests according to Robinson with regard to odor and flavor of prints with the ink according to the invention resulted in an evaluation which was clearly below 2. This means that the requirements to low odor inks were completely met.

With the employment of the offset printing inks according to the present invention the mass transfer, which is considered to be technically unavoidable according to §31, section 1 of the food and requisite law, is very substantially reduced or eliminated in comparison to the inks of the prior art.

Example 2

An offset printing ink was produced according to the following formulation:

| | | | |
|---|---|---|---|
| Irgalith Blau GLG ® | Ciba Geigy GmbH | Pigment Blue 15:3 | 15% |
| Ceridust 3620 ® | | | 1% |
| Rice starch powder type B | | | 0.5% |
| XR-1769 | Lawter International | KP resin | 7.6% |
| Jonrez RP-372 ® | Westvaco | KP resin | 21% |
| Priolube 1427 ® | Unichema International | Trimethylolpropane trioleate | 54.9% |
| | | | 100% |

Example 3

An offset printing ink was produced according to the following formulation:

| | | | |
|---|---|---|---|
| Sico Echtgelb D 1361 DD ® | BASF AG | Pigment Yellow 13 | 12% |
| Ceridust 3620 ® | | | 1% |
| Rice starch powder type B | | | 0.5% |
| Resenol 9080 ® | D.R.T. | KP resin | 14.3% |
| Tergraf UZ-79 ® | Resisa | KP resin | 11.5% |
| BOE-HS 201 ® | BOE-Chemie | Allyl ester of multivalent organic acids | 11.3% |
| Crodamol PTC ® | Croda GmbH | Pentaerythritol tetracaprate | 47.4% |
| Co-Mn-octoate 2/6.5% in the combination with soya | Abshagen & Co KG | | 2% |
| | | | 100% |

Example 4

An offset printing ink was produced according to the following formulation:

| | | | |
|---|---|---|---|
| Lutetia Rubin BLDN 375 ® | | | 18% |
| Ceridust 3620 ® | | | 1% |
| Rice starch powder | | | 0.5% |
| Jonrez IM 832 ® | Arizona Chemical | KP resin | 14.1% |
| Alsynol RL 25N ® | Arizona Chemical | KP resin | 9.9% |
| BOE-HS 201 ® | BOE-Chemie | Allyl ester of multivalent organic acids | 9.2% |
| Crodamol TMP-CC ® | Croda GmbH | Trimethylolpropane tricapryl/caprate | 45.3% |
| Co-Mn-octoate 2/6.5% in the combination with soya | | | 2% |
| | | | 100% |

Example 5

An offset printing ink was produced according to the following formulation:

| | | | |
|---|---|---|---|
| Elftex 415 ® | Cabot GmbH | Pigment Black 7 | 18% |
| Ceridust 3620 ® | | | 1% |
| Rice starch powder type B | | | 0.5% |
| Tergraf ND-1243 ® | Resisa | KP resin | 13.1% |
| Ultrarez 8226 ® | Lawter International | KP resin | 10.9% |
| Crodamol PTIS ® | Croda GmbH | Pentaerythritol tetraisostearate | 56.5% |
| | | | 100% |

The processing of the examples 2 to 5 was carried out on a sheet-fed offset printing machine of the type MAN-Roland R 700 at a printing output of 8000–12000 copies/h under employment of a damping solution having 5% isopropanol. In this case, printing was carried out on coated and uncoated paper and cardboard types, the fibrous substance consisting of wood pulp, cellulose or recycling fibres. The offset printing inks were manufactured in an uncoated state or in a coated state (inline with emulsion paint).

In all cases, it turned out that the abrasion resistance, coating adhesion, drying and subsequent treatment met the high requirements of the producers of packing means. Therefore, with regard to these essential properies the inks according to the invention were, at least, equal to the offset printing inks for the printing of packing of the prior art. Just as well did the printability and printing quality on high-speed sheet-fed offset printing machines, too, meet at least the quality standard of the inks of the prior art. However, the inks according to the invention made it possible now to make use of renewable raw materials as starting materials for offset printing ink components and, moreover, to provide inks which show low odor, flavor as well as low swelling.

These advantageous surprising properties of the offset printing ink are based on the selection and combination of the resins and fatty acid esters according to the invention.

What is claimed is:

1. Offset printing ink composition comprising at least one component selected from the group consisting of (A) a colophony-modified phenolic resin, (B) a maleic resin, (C) a modified hydrocarbon resin, (D) a colophony resin ester, and mixtures thereof, said composition further comprising at least one component selected from the group consisting of a water-insoluble fatty acid ester of a multivalent alcohol having a high steric spatial requirement, a water-insoluble fatty acid ester of ethinol, and a mixture thereof, said esters having steric dimensions of the diameter $l_{max}$ of from about 2.0 to about 7.0 nm and the volume $V_{mean}$ of from about 1.0 to about 21.0 nm$^3$.

2. Offset printing ink composition as in claim 1 characterized in that said composition further comprises a multifunctional allyl ester of a multivalent organic acid.

3. Offset printing ink composition as in claim 2 characterized in that said fatty acid of the fatty acid ester has a carbon chain containing from about 6 to about 26 carbon atoms.

4. Offset printing ink composition as in claim 2 characterized in that said resins A, B, C and D each has molecular weight $M_w$ of from about 5000 to 120,000, an acid number of from about 10 to about 40, a hydroxyl number of from about 26 to about 70 and a melting range of from about 120 to about 190° C.

5. Offset printing ink composition as in claim 1 characterized in that said composition further comprises a polyallyl ether.

6. Offset printing ink composition as in claim 5 characterized in that said fatty acid of the fatty acid ester has a carbon chain containing from about 6 to about 26 carbon atoms.

7. Offset printing ink composition as in claim 5 characterized in that said multivalent alcohol is selected from the group consisting of trimethylolpropane, pentaerythritol, dipentaerythritol, sorbitol, 2-butyl-2-ethyl-1,3-propanediol and mixtures thereof.

8. Offset printing ink composition as in claim 5 characterized in that said resins A, B, C and D each has molecular weight $M_w$ of from about 5000 to 120,000, an acid number of from about 10 to about 40, a hydroxyl number of from about 26 to about 70 and a melting range of from about 120 to about 190° C.

9. Offset printing ink composition as in claim 1 characterized in that said fatty acid of the fatty acid ester has a carbon chain containing from about 6 to about 26 carbon atoms.

10. Offset printing ink composition as in claim 1 characterized in that said multivalent alcohol is selected from the group consisting of trimethylolpropane, pentaerythritol, dipentaerythritol, sorbitol, 2-butyl-2-ethyl-1,3-propanediol and mixtures thereof.

11. Offset printing ink composition as in claim 1 characterized in that said resins A, B, C and D each has molecular weight $M_w$ of from about 5000 to 120,000, an acid number of from about 10 to about 40, a hydroxyl number of from about 26 to about 70 and a melting range of from about 120 to about 190° C.

* * * * *